Aug. 16, 1960     J. S. FINGER ET AL     2,948,950
REINFORCED TRANSLUCENT PANEL
Filed July 21, 1953     2 Sheets-Sheet 1
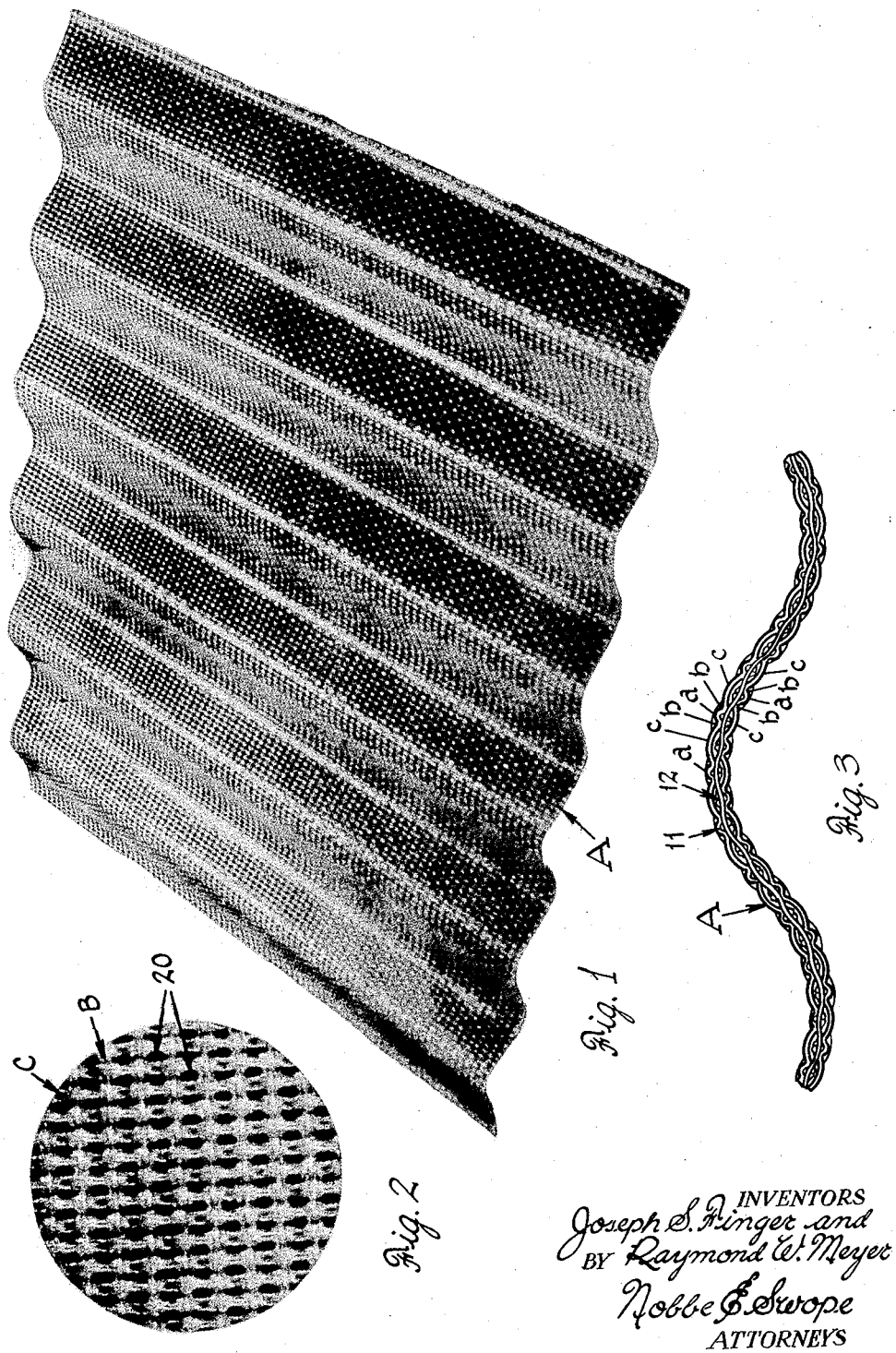
INVENTORS
Joseph S. Finger and
BY Raymond W. Meyer
Nobbe & Swope
ATTORNEYS Aug. 16, 1960   J. S. FINGER ET AL   2,948,950
REINFORCED TRANSLUCENT PANEL Filed July 21, 1953   2 Sheets-Sheet 2

INVENTORS
Joseph S. Finger and
BY Raymond W. Meyer
Nobbe & Swope
ATTORNEYS

United States Patent Office 2,948,950
Patented Aug. 16, 1960

2,948,950

REINFORCED TRANSLUCENT PANEL

Joseph S. Finger and Raymond W. Meyer, Bellaire, Tex., assignors, by mesne assignments, to L-O-F Glass Fibers Company, Toledo, Ohio, a corporation of Ohio Filed July 21, 1953, Ser. No. 369,494

10 Claims. (Cl. 28—80)

The present invention relates broadly to plastic products, and is more particularly concerned with a reinforced plastic panel having a novel decorative appearance.

Structural building panels in the form of substantially rigid plastic sheets provided with a reinforcing fibrous core are currently finding ever increasing uses in domestic and industrial installations as walls, roofs, partitions, outdoor signs, canopies, awnings, and fixture facings. The major portion of the panels now being produced are translucent, and in addition to functioning to soften the harsh, direct sun rays without darkening inside rooms, possess the desirable physical characteristics of being light weight, fire-safe, and shatterproof.

In accordance with present production procedures, these colorful and decorative building panels are formed of a loose mass or bonded mat of glass fibers embedded in and impregnated with a thermosetting plastic material. The reinforcing fibers now being employed are randomly distributed throughout the plastic body, and while they have been very effective as a material of exceptionally high strength-weight ratio to increase the durability of the plastic, the non-uniform arrangement of the fibers has left something to be desired by way of the appearance of the finished article. As a result, there have been continued efforts in the field to render the fibers substantially invisible within the plastic body, as for example, by attempting to match the respective indices of refraction of the glass and plastic, and by chemical treatment of the fibrous surfaces. Consequent upon these and other activities, the reinforcing fibers as now being utilized in structural translucent panels have contributed little, if anything, to the decorative features of the completed plastic article.

Further, it has been found that fibrous glass mats often vary from five to twenty-five percent in weight per square foot, causing variations in the translucency of the reinforced plastic article, known as "blotchiness." However, by using a woven material these variations are reduced to less than 5%, resulting in uniform translucency.

It is therefore an important aim of the present invention to provide a reinforced plastic article in which the fibrous core not only effectively functions to increase the strength of said article, but in addition imparts a pleasing decorative appearance thereto.

Another object of the invention is to provide a structural panel comprising a plastic base and a reinforcing fibrous core, said core being constructed so as to grant to the panel the desired combination of uniform texture, relatively high strength, and highly satisfactory light transmission.

Still another object of the present invention lies in the provision of a reinforced plastic sheet for structural purposes in which the reinforcement is provided by a fibrous glass core having substantially uniformly arranged crossing yarns of a critical diameter and construction.

A further object of the invention is to provide a plastic panel reinforced with a woven fibrous core which imparts to said panel a uniform textured pattern and comprises a fabric of predetermined thickness having at least two sets of fibrous yarns interlaced at right angles to provide a fabric having a controlled range of warp ends and weft picks per unit.

A still further object of the invention is to provide a plastic-reinforced structural panel formed of a resinous base and an embedded woven fibrous core, said panel having a relatively uneven surface comprised of alternating high and low spots extending in equally spaced intersecting rows which produce high lighted areas where the strands of the woven core cross one another to provide a lens effect when viewed at any angle.

Other objects and advantages of the invention will become more apparent during the course of the following description when taken in connection with the accompanying drawings.

In the drawings wherein like numerals are employed to designate like parts throughout the same:

Fig. 1 is a perspective view of a reinforced plastic article embodying the present invention;

Fig. 2 is an enlarged plan view of a portion thereof;

Fig. 3 is an enlarged end view thereof;

Figure 4:
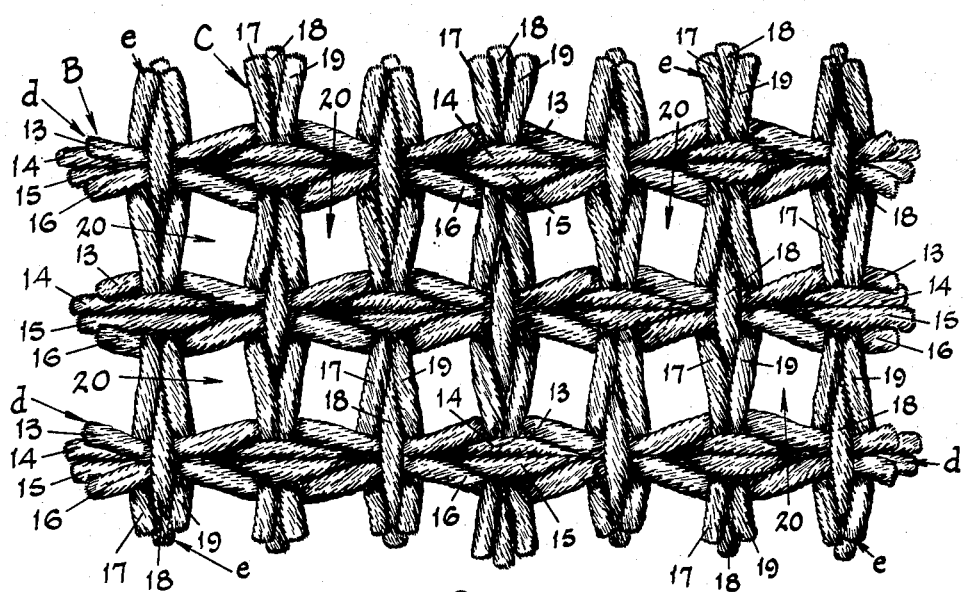
Fig. 4 is a greatly enlarged fragmentary view of a preferred form of woven material employed in the present invention.

With reference now to the drawings, and particularly to Figure 1 thereof, there is illustrated a reinforced plastic article A which is representative of a preferred form of the invention. As shown, the article A comprises a plastic base 11 which has a layer of woven fibrous material 12 embedded therein. The plastic base is preferably formed of a thermosetting resin of the polyester type, and among those which have been found suitable are the Selectron resins of Pittsburgh Plate Glass Company, the Laminac resins of American Cyanamid Company and the like. However, it may at times be desired to use other than polyester resins, and among those which have the desired properties are phenol or urea formaldehyde, the polystyrenes, acrylic resins, and many other resins of the clear type. In addition, certain catalysts may be employed to aid in forming a hard, strong, solid mass, and for this purpose, benzoyl peroxide, tertiary butyl perbenzoate, methyl-ethyl ketone peroxide and the like are quite satisfactory. To obtain the desired color, any of the conventional pigments may be added to the resins, or as an alternative, the woven fibrous material 12 may be dyed and a clear untinted resin used to form the plastic base.

The woven fibrous material 12 may be provided by a fabric sheet woven from one or more of a number of substances, such as for example, glass, cellulose or cellulose base, nylon, rayon, certain synthetic and vegetable fibers, or burlap as commonly produced from jute, flax, hemp or manila fibers. Experience to date has indicated that glass cloth has produced the optimum results and will therefore be herein described by way of illustration.

In order to produce the desired textured pattern in the finished plastic article A, and to impart to said article sufficient rigidity without adversely affecting the light transmission thereof, it has been found that the glass cloth should conform to a number of well-defined requirements. First, the fibers or yarns forming the cloth are preferably of a denier referred to as 75's, 150's, 450's or between this range. As known in the trade, glass fibers designated as 75's comprise 7,500 yards per pound (fiber diameter about 0.0005 inch); 150's comprise 15,000 yards per pound (fiber diameter about 0.00036); and 450's refer to fibers which constitute 45,000 yards per pound (fiber diameter about 0.00021). Other commonly employed glass yarns are 225's and 900's, and certain conditions may dictate their employment in connection with the present invention.

In addition to fiber denier or diameter, it has been found that the type of weave which is used bears importantly on texture, strength and transmission. To illustrate, those weaves referred to in the textile industry as mock leno, basket, and special open weaves are most suitable, and particularly the first. However, it will be appreciated that by proper selection of strand diameter and/or weaving yarn construction, that is, the number of twisted strands and plied yarns in the weaving yarn, other types of weaves such as certain gauze and plain weaves may be found satisfactory, provided of course, that the fabric possesses the other characteristics herein disclosed.

It has been further found important that the fabric have a particular construction. To elaborate, experience indicates that the glass cloth should have a thickness of not less than 8 mils or about 0.008 inch and not more than 50 mils or about 0.050 inch, and more desirably, between 16 mils and 28 mils in thickness. In addition, in order to accomplish the "texturized" effect without a sacrifice in strength, the number of warp yarns per inch should preferably be within the range of 25 and 60, and the number of fill or weft yarns per inch within the range of 10 to 30. However, since it has been found that when the number of warp and weft yarns per inch exceeds the upper limits of these figures that the light transmission of the panel is lowered, and that when the lower limits of these figures are not observed the strength of the panel and the texture thereof are not completely acceptable, it is believed highly desirable that the number of warp and weft yarns per inch be maintained between 35 and 50, and between 15 and 25, respectively.

And it has also been noted that the yarn count has a very definite bearing upon the light transmission, texture, and strength of the composite plastic body A. Thus, if the yarn count is below a predetermined figure, the texture of the glass cloth is not suitable and the transmission of the plastic body is exceedingly high and the harsh sun rays are not adequately diffused. On the other hand, if the glass or other yarn count exceeds a controlled figure, the light transmission through the panel is reduced to such an extent that translucency is low or diminished beyond the point of desirability.

Specifically, in the glass fiber art, yarn count is designated in the form of a fraction in which the numerator indicates the number of original strands twisted and the denominator the number of these strands which have been plied. To illustrate, a yarn count of 1/0 indicates that a single original strand has been given a twist and has not been plied, while a yarn count of 4/5 designates that four strands have been twisted and that five of these twisted strands have been plied.

In accordance with the present invention it has been found that the most desirable results by way of texture, transmission and strength are obtained when the product of the numerator and the denominator in the yarn count is between six and twelve, which may be obtained for example, by employing yarns having a count of 2/3 up to 3/4 or 2/6. However, it is of course possible to produce an effective plastic article in which the product of the yarn count numerator and denominator varies slightly from the noted range of six to twelve, by varying the type of weave and the number of warp ends and weft fills per inch. In the majority of instances, however, the most satisfactory results will be found by remaining within the preferred range.

A plastic article A in which a resinous base 11 of a thermosetting plastic encases a sheet of woven fibrous material 12 constructed in accordance with the present invention, is illustrated in the accompanying drawings. As shown in Figure 3, an enlarged end view of the article A of Figure 1, said article or panel has a relatively uneven surface on the top and bottom thereof caused by the particular weave which has to date been found the most suitable.

Specifically, it will be noted in Figure 3 that there are a plurality of spaced high convex surface areas at high spots *a* separated from one another by low spots *b* and low convex surface areas of relatively greater resin concentration at *c*, the high spots *a* on one surface of the panel being opposed on the other surface of said panel by heavy resin areas *c*, and vice versa resulting in a double convex lens effect. Such is the result of the type of weave employed and will be more clearly understood after reference is made to Figures 4 and 5, enlarged views of the preferred fabric itself.

Figure 5:
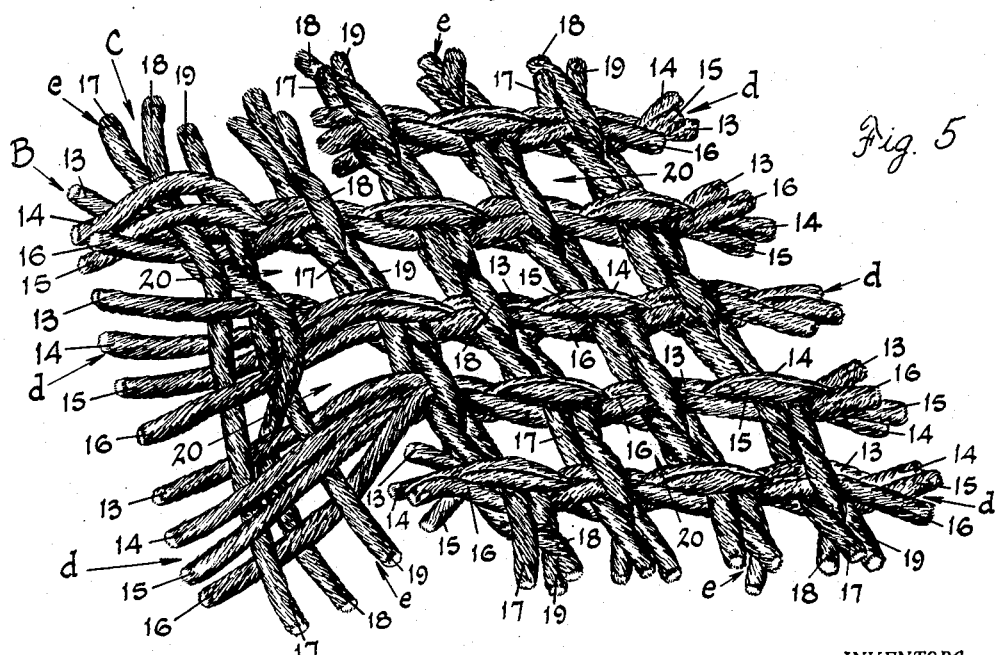
Fig. 5 is a greatly enlarged perspective view of the woven material of Fig. 4, and showing particularly the interlacing of the strands.

The fabric found to impart the desired textured appearance to a resinous base is provided with a mock leno weave, although of course, other types of weaves will be apparent to those skilled in the art. In Figures 4 and 5 the warp B has been illustrated as running horizontally and the weft or fill C in a vertical direction. As thus constructed and arranged, it will be seen that the warp comprises groups of yarns and each group is composed of four threads or yarns 13, 14, 15 and 16 and the weft comprises groups of yarns and each group comprises three threads or yarns 17, 18 and 19. And upon examination of the actual fabric employed, the sett of the fabric or number of warp and weft yarns per lineal inch is eleven groups of yarn each designated by the letter *d* or forty-four yarns or ends per inch in the warp. The weft C, on the other hand, is composed of eight groups of yarns *e* or twenty-four threads or ends per inch. The fabric is therefore designated in the art as having a 44 by 24 sett.

Although, as noted, other types of weaves productive of the desired results will be apparent to those versed in the art, in the selected mock leno weave the particular arrangement or interlacing of the groups of warp and weft yarns has been found to bear importantly on the production of the desired high spots and texture. To this end it will be noted from Figure 5 particularly that weft yarns 17 and 19 pass under warp yarns 14 and 15 in one row of the warp B and in the same row over warp yarns 13 and 16. In addition, in this same row, weft yarn 18 passes completely under all of the warp yarns 13, 14, 15 and 16. In the next warp row it is to be observed that the interlacing of the weft yarns 17 and 19 has been reversed with respect to the warp yarns. That is to say, in the next warp row, weft yarns 17 and 19 pass under warp yarns 13 and 16 and over warp yarns 14 and 15, the odd weft yarn, 18, in this row passing completely over all four warp yarns.

The particular woven pattern above described repeats itself throughout the fabric to provide substantially rectangular interstices 20 over its entire width and length, as well as groups of warp yarns *d* and groups of weft yarns *e* of substantially uniform diameter throughout either the warp B or weft C.

And it is believed to be the above-described manner in which the warp and weft yarns interlace which provides in the plastic article A the high spots *a*, low spots *b*, and heavy resin areas *c*, earlier noted, said spots and areas of varying height contributing to the production of the individual highlighted areas which are one of the characteristics and novel features of the article A shown in Figure 1. To explain, the high spots *a* of Figure 3, which provide the white or highlighted areas in the composite panel A, are produced at those portions of the fabric where the weft yarn 18 passes over the four warp yarns 13, 14, 15 and 16, and being of relatively greater height than the other points of interlacing at which said weft yarn 18 is located under all four warp yarns, are coated or impregnated with the resin to a lesser degree. By the same token, at all other points of interlacing where the weft yarn 18 is under the four warp yarns 13, 14, 15 and 16, and therefore the warp yarns 14 and 15 are outermost in the fabric, there is an area relatively lower than the high spot a and a relatively greater amount of resin is lodged therein, producing the heavy resin area c. And at those points between the high spots a and resin areas c there are the low spots b which are covered over by a greater quantity of resin than on the high spots a, or in actuality, on the uppermost portion of the weft yarn 18 as it passes over the warp yarns 13, 14, 15 and 16. And further contributing to render more apparent the highlighted areas, is of course the presence of uniformly shaped interstices 20 which are filled in by the resin and are therefore of a relatively darker hue.

In order to emphasize the presence of a uniformly woven structure within the plastic base 11, and thus to render its texture more easily discernable, it has been found desirable that the woven material 12, such as glass, be treated in such a way that it does not disappear in the resin. This is preferably done during the process of manufacturing the fibers by applying a size thereto; however, substantially the same end result may also be accomplished by applying a finish to the glass fabric during or after the weaving process. Such a size or finish may comprise starch emulsions, urea formaldehyde, methyl methacrylate, melamine formaldehyde, or pigmented sizes or finishes of other types which are of a nature that they preserve the appearance of the strands after impregnation in the resin.

The woven glass cloth illustrated in the drawings, and which is presently preferred, was formed of 150 denier yarn (fiber diameter about 0.00036 inch) having a yarn count of 3/2. The thickness of the chosen cloth was approximately 23 mils or 0.023 inch. However, as noted, variations may be practiced within the scope of the present invention provided that the finished plastic article has a texture characterized by uniformly arranged alternating high and low spots, said high spots providing a lens effect when viewed at any angle, and also that the fabric forming a part of said plastic article contains strands of substantially uniform diameter and that the interstices in said fabric are of generally uniform shape, spaced substantially equal distances from one another.

Figure 6:
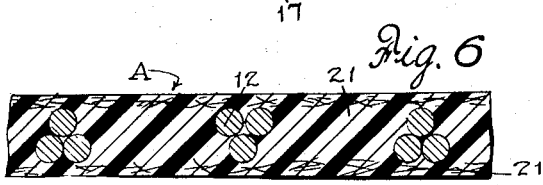
Fig. 6 is an enlarged sectional view of a panel having a glass surfacing mat incorporated on opposite sides of the woven fabric.

As shown in Fig. 6, it may at times be found desirable, in order to increase the thickness of the panel A, add protection to the cloth reinforcement 12, and smooth out the surface, to position a glass surfacing mat 21 on opposite sides of the woven fabric prior to finally curing the resin. Such a mat may be formed of extremely small diameter fibers, known in the trade as superfine fibers, and preferably has a thickness between three and twenty-eight mils. Panels not employing a surfacing mat on opposite sides of the woven core have been found to have the desired texture, strength and appearance. However, since the mat is invisible in the resin, it does not interfere with the appearance of the final structural panel.

Although the reinforced plastic article A illustrated in the drawings is of corrugated cross-section, it will be appreciated that the present invention is also applicable to panels of other cross-sections, as well as to substantially flat reinforced panels.

It is to be understood that the form of the invention herein shown is to be taken as the preferred embodiment of the same, but that various changes may be made in the construction of the fabric and other details without departing from the scope of the invention as defined in the appended claims.

We claim:

1. A reinforced translucent panel comprising a woven translucent fibrous core impregnated with a resinous material and then cured comprising a woven translucent fibrous core including a plurality of spaced groups of intersecting warp yarns and weft yarns, the yarns of each group or warp yarns being interlaced with the yarns of each group of weft yarns at said points of intersection to provide a plurality of alternating high and low surface areas on both surfaces on said woven fibrous core, said woven translucent fibrous core being impregnated with a resinous material to form a coating thereon so that the resinous material on said high and low surface areas assumes a convex curvature, said high surface areas on one surface of said woven translucent fibrous core being disposed opposite to the low surface areas on the other surface of said woven translucent fibrous core, and said low surface areas on said one surface being disposed opposite to the high surface areas on said other surface of said woven translucent fibrous core, said resinous material on each of said opposite high and low surface areas forming a double convex lens to high light the high surface areas on one surface of said reinforced translucent panel when that surface is viewed from an angle inclined to the plane of the panel.

2. A reinforced translucent panel as in claim 1, wherein each group of warp yarns has at least four warp yarns and each group of weft yarns has at least three weft yarns, the yarns of each group of warp yarns are interlaced with the yarns of each group of weft yarns so that the weave of each group of weft yarns, with respect to the interlaced group of warp yarns, is repeated every second group of weft yarns, the intermediate group of weft yarns of any three adjacent groups of weft yarns having a reverse weave whereby a diagonal cross-sectional plane taken through successive points of interlacing of three adjacent groups of weft yarns, with respect to the plane of a group of weft yarns, discloses a cross-sectional area for each group of weft yarns identical to the cross-sectional area of all other of the groups of weft yarns on the cross-sectional plane at the points of interlacing.

3. A reinforced translucent panel as in claim 1, wherein the interlacing groups of warp and weft yarns form therebetween uniformly shaped interstices which, when the woven translucent fibrous core is impregnated with resin, are completely filled by the resin and are of a darker hue than the high lighted high surface areas.

4. A reinforced translucent panel as in claim 1, wherein said woven translucent fibrous core includes a plurality of groups of warp and weft yarns, said groups of yarns comprising a plurality of twisted yarns, said groups of warp yarns having a greater number of yarns than said groups of weft yarns, with the yarns of the groups of warp yarns interlacing with the yarns of the groups of weft yarns, at least one of the yarns in each group of weft yarns alternately passing over and under and adjacent group of warp yarns whereby a first high surface area is formed on one surface of the core at the point of interlacing of the groups of warp and weft yarns when a weft yarn overpasses a group of warp yarns, and a second high surface area is formed by said same weft yarn on the opposite surface of the core as it passes under an adjacent group of warp yarns, said first and said second high surface areas alternately repeating the full length of said weft yarn as it appears successively on opposite surfaces of the fibrous core.

5. A reinforced translucent panel as in claim 4, wherein a first low surface area is formed on one surface of the core at the point of interlacing of the groups of warp and weft yarns by at least two warp yarns passing under a group of weft yarns, and a second low surface area is formed by said same two warp yarns on the opposite surface of the core as it overpasses an adjacent group of weft yarns, said first and said second low surface areas alternately repeating the full length of said warp yarns as they appear successively on opposite surfaces of this fibrous core, said first high surface area being diametrically opposed to and on the opposite surface of said material at a point of interlacing of the groups of warp and weft yarns from said first low surface area, and said second high surface area being opposed to and on the opposite surface of said core at a point of interlacing of the groups of warp and weft yarns from said second low surface area.

6. A reinforced translucent panel as in claim 1, wherein each group of warp yarns are comprised of at least three twisted yarns and each group of weft yarns are comprised of at least two twisted yarns, said yarns being formed of continuous glass fibers.

7. A reinforced translucent panel as in claim 1, wherein each group of warp yarns are comprised of four twisted yarns and each group of weft yarns are comprised of three twisted yarns, said yarns being formed of continuous glass fibers.

8. A reinforced translucent panel as in claim 1, wherein each of said groups of warp yarns has a greater number of yarns than each of said groups of weft yarns, said yarns being formed of continuous glass fibers, and the product of the numerator and denominator of the yarn count is not less than 6 and is not greater than 12.

9. A reinforced translucent panel as in claim 1, wherein the number of yarns per inch in the warp is between 25 and 60 inclusive and in the weft between 10 and 30 inclusive.

10. A reinforced translucent panel as in claim 1, wherein said yarns are formed of continuous glass fibers, said woven translucent fibrous core having a thickness in the range from 0.0008 inch to 0.050 inch inclusive, and in which the number of yarns per inch in the warp is between 25 and 60 inclusive and in the weft between 10 and 30 inclusive, and also in which the product of the numerator and denominator in the yarn count is between 6 and 12 inclusive.

References Cited in the file of this patent

UNITED STATES PATENTS

| | | | |
|---|---|---|---|
| D. 26,780 | Smith | Mar. 16, | 1897 |
| 928,642 | Elliott | July 20, | 1909 |
| 1,730,263 | Brooks | Oct. 1, | 1929 |
| 2,133,237 | Slayter | Oct. 11, | 1938 |
| 2,311,613 | Slayter | Feb. 16, | 1943 |
| 2,350,504 | Geier et al. | June 6, | 1944 |
| 2,381,542 | Hyatt et al. | Aug. 7, | 1945 |
| 2,583,341 | Reese | Jan. 22, | 1952 |
| 2,681,870 | Novak | June 22, | 1954 |
| 2,703,774 | Morrison | Mar. 8, | 1955 |
| 2,740,725 | Ball | Apr. 3, | 1956 |

OTHER REFERENCES

"Modern Plastics," November 1945, pages 137–139.

"Ind. and Eng. Chem.," vol. 45, page 1281, June 1953.

"Sizes for Glass Textiles for Reinforcing Polyester Plastics," reprint from "American Dyestuff Reporter," Aug. 18, 1952.

"Fiberglas Standards PR6.A1, section I, Oct. 16, 1950," page 2, Owens-Corning Fiberglas Corp.

"Fiberglas Standards PR6.A1, section VI, Feb. 1, 1951," page 1, Owens-Corning Fiberglas Corp.

"Fiberglas Standards PR6.C1, July 1952," page 6, Owens-Corning Fiberglas Corp.